US012771524B2

(12) United States Patent
Mora-Golding et al.

(10) Patent No.: US 12,771,524 B2
(45) Date of Patent: Oct. 20, 2026

(54) REMOTE ATTESTATION FOR RESOURCE-CONSTRAINED DEVICES

(71) Applicant: DENSO CORPORATION, Kariya (JP)

(72) Inventors: Carlos Mora-Golding, Southfield, MI (US); Ameer Kashani, Southfield, MI (US); Madoka Asai, Kariya (JP); Takeshi Nakamura, Torrance, CA (US); Tomonori Ikuse, Kariya (JP); Yasuharu Sugano, Kariya (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 18/816,627

(22) Filed: Aug. 27, 2024

(65) Prior Publication Data

US 2026/0067061 A1 Mar. 5, 2026

(51) Int. Cl.
*H04L 9/00* (2022.01)
*H04L 9/32* (2006.01)

(52) U.S. Cl.
CPC ............ *H04L 9/008* (2013.01); *H04L 9/3239* (2013.01)

(58) Field of Classification Search
CPC .............................. H04L 9/008; H04L 9/3239
See application file for complete search history.

(56) References Cited

U.S. PATENT DOCUMENTS

| | | | | |
|---|---|---|---|---|
| 10,726,000 | B1 * | 7/2020 | Fortney | H04L 9/3239 |
| 12,107,869 | B1 * | 10/2024 | Kannan | H04L 63/20 |
| 2018/0365424 | A1 | 12/2018 | Callaghan et al. | |
| 2023/0239153 | A1 * | 7/2023 | Ragnoli | H04L 9/3297 713/168 |
| 2023/0273808 | A1 * | 8/2023 | Atamli | G06F 21/53 718/1 |
| 2024/0205224 | A1 | 6/2024 | Xiao et al. | |

FOREIGN PATENT DOCUMENTS

| | | |
|---|---|---|
| CN | 108664221 B | 4/2022 |
| CN | 117421780 A | 1/2024 |

* cited by examiner

*Primary Examiner* — Henry Tsang
(74) *Attorney, Agent, or Firm* — Christopher G. Darrow; Darrow Mustafa PC

(57) ABSTRACT

Systems, methods, and other embodiments described herein relate to remote attestation for resource-constrained systems. In one embodiment, a method includes acquiring segments of system data within an attesting device responsive to an attestation request. The method includes determining an integrity of the system data by identifying whether a root hash comprised of integrity hashes of the segments matches a reference hash. The method includes providing a report according to the integrity.

20 Claims, 8 Drawing Sheets

REMOTE ATTESTATION FOR RESOURCE-CONSTRAINED DEVICES

TECHNICAL FIELD

The subject matter described herein relates in general to systems and methods for remote attestation and, more particularly, to using a homomorphic hash to facilitate remote attestation of software on devices with resource constraints.

BACKGROUND

Traditionally, vehicle security has involved a vehicle owner using a physical key to lock a door and/or start a vehicle manually. As technology advances, vehicle systems have morphed into more complex systems that involve additional features but also encounter additional/different risks. For example, many vehicles now include electronic systems that have the ability to collect data about the operation of the vehicle, communicate with remote systems, receive/provide electronic controls, and so on. However, along with enriched features and connectivity to outside networks comes the potential for attacks by malicious actors on computing systems in the vehicle that provide for these advanced features. For example, malicious actors may attempt to gain access to vehicle systems in order to alter the operation of the vehicle, steal sensitive information, and so on.

In particular, various computing systems within the vehicle can include a myriad of programs that function together in order to provide for the noted functionality. To secure these programs, the system may perform remote attestation at the request of a trusted service provider. In this arrangement, the data that is under attestation needs to be collected before the system can compute the values for comparison. Accordingly, if the size of the data is greater than the working memory (e.g., buffer, cache, etc.), then the system cannot effectively perform the calculations. Moreover, using remote attestation in trusted execution environments (TEE), or with other privileged programs having restricted memory space, encounters the same difficulties of being unable to compute the hash values on the data because of data size. The same resource constraints can further limit parallel remote attestation requests since available memory can be quickly consumed by a single process. Accordingly, confirming the integrity and securing software packages within systems with limited resources represents a specific difficulty that can impact the security of the system overall.

SUMMARY

Example systems and methods associated with remote attestation for a resource-constrained device are disclosed. As previously noted, malicious attacks on the computing system of a vehicle can cause significant difficulties. While some attacks may simply expose sensitive information, other attacks may cause problems with the functioning of different vehicle systems. Moreover, because various systems are implemented for specific purposes, these systems may have limited resources (e.g., memory) for performing tasks, especially tasks that are secondary to a primary purpose of the system. As such, effectively implementing integrity checks and security routines in these devices can present specific difficulties.

Therefore, in one approach, an inventive system functions to secure a computing system within a device, such as a vehicle, by using an incremental hash (i.e., also referred to as homomorphic hash herein), which can avoid issues with attempting to process all system data at once. For example, the inventive system periodically performs an attestation process to validate the system data that includes, in various arrangements, program code/instructions and associated program data. The system may be induced to perform the attestation according to an attestation request from a remote entity (e.g., a trusted attestation system associated with an OEM) or according to a defined schedule. In either case, the system may monitor for an attestation request and proceed to validate the system data when received.

In particular, the system may pass the attestation request to a trusted program that executes, for example, within a trusted execution environment (TEE). The system then acquires segments of the system in either a predefined size or a dynamically determined size. In the case of being dynamically sized, the system can determine the size according to an extent of available memory within the TEE or according to another indicator. Whichever approach is undertaken, the system does not validate the entirety of the system data at once but instead processes segments of the system data in order to accommodate the constrained resources of the system. Moreover, in one or more configurations, the system, even though operating under constrained resources, does not impact the normal execution of other programs when performing attestation but operates in conjunction with execution of other tasks to achieve the attestation. Thus, the trusted program receives the system data as the segments and individually generates integrity hashes of the segments. The integrity hashes are digests that represent the contents of the segments. Thus, if the values of the segments change, then the resulting integrity hashes will be distinct from hashes generated from the original contents.

Accordingly, the system further processes the multiple integrity hashes into a root hash using a homomorphic hash function. The homomorphic hash effectively combines the integrity hashes into a single hash while summarizing the representations of the segments. Thus, the root hash represents the current state of the system data and whether any changes have occurred from an original trusted version of the system data. Consequently, the system can then, in at least one arrangement, compare the root hash with a reference hash stored in a secure storage of the attesting or verifying device. The reference hash is the root hash of the original contents of the system data, as previously verified. Thus, if the root hash and the reference hash match, then the system can validate the integrity of the system data. Otherwise, the integrity of the system data is compromised.

Whichever result the system identifies, the system then proceeds to generate a report about the attestation. The report can include different information depending on the result. For example, in a case where the system identifies that the integrity has been compromised, the report may include the integrity hashes along with an indication of the negative result. In further examples, the report can include attribute information about the separate segments, such as sizes of the separate segments, memory address ranges of the segments, timestamps for when each integrity hash was generated, etc. Otherwise, the system generates the report to specify that the system data is valid.

The remote entity to which the system is attesting receives the report and either verifies that the report indicates the attestation succeeded and the system data remains valid and uncorrupted or that the attestation failed. When the attestation fails, the remote entity, in at least one arrangement, performs additional functions to verify the result. For example, the remote entity may verify the individual segments of the system data to facilitate tracing the source of the attestation failure. To achieve this, the remote entity hashes a verified version of the original content of the system data. That is, the remote entity stores a copy of the system data that is known to be valid. The remote entity then is able to hash the segments of the system data stored at the remote entity according to the dynamic or predefined sizes of the segments to generate segment hashes. The segment hashes align with the integrity hashes generated at the attesting device. As such, the remote entity then compares the segment hashes with the integrity hashes provided in the report. From this comparison, the remote entity is able to identify which segments have been altered.

The remote entity can then use the information about the segments to perform further forensic investigation to identify a source of the alterations (e.g., a particular malicious attack) and may also provide mitigation instructions to the attesting device. The remote entity communicates the mitigation instructions to the attesting device in a report, acknowledgement, or another communication in order to cause the attesting device to undertake one or more mitigation actions. The mitigation actions can include restoring the system data to a known valid state, disabling at least a portion of the attesting device to prevent further malicious alteration or other actions that are intended to thwart the malicious attack on the attesting device. In this way, the present approach is able to improve the security of devices with limited resources by ensuring the ability to perform attestation and identify when a malicious alteration of the system data has occurred.

In one embodiment, a security system is disclosed. The security system includes one or more processors and a memory that is communicably coupled to the one or more processors. The memory stores a control module including instructions that, when executed by the one or more processors, cause the one or more processors to acquire segments of system data within an attesting device responsive to an attestation request. The control module includes instructions to determine an integrity of the system data by identifying whether a root hash comprised of integrity hashes of the segments matches a reference hash. The control module includes instructions to provide a report according to the integrity.

In one embodiment, a non-transitory computer-readable medium is disclosed. The computer-readable medium stores instructions that, when executed by one or more processors, cause the one or more processors to perform the disclosed functions. The instructions include instructions to acquire segments of system data within an attesting device responsive to an attestation request. The instructions include instructions to determine an integrity of the system data by identifying whether a root hash comprised of integrity hashes of the segments matches a reference hash. The instructions include instructions to provide a report according to the integrity.

In one embodiment, a method is disclosed. The method includes acquiring segments of system data within an attesting device responsive to an attestation request. The method includes determining an integrity of the system data by identifying whether a root hash comprised of integrity hashes of the segments matches a reference hash. The method includes providing a report according to the integrity.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
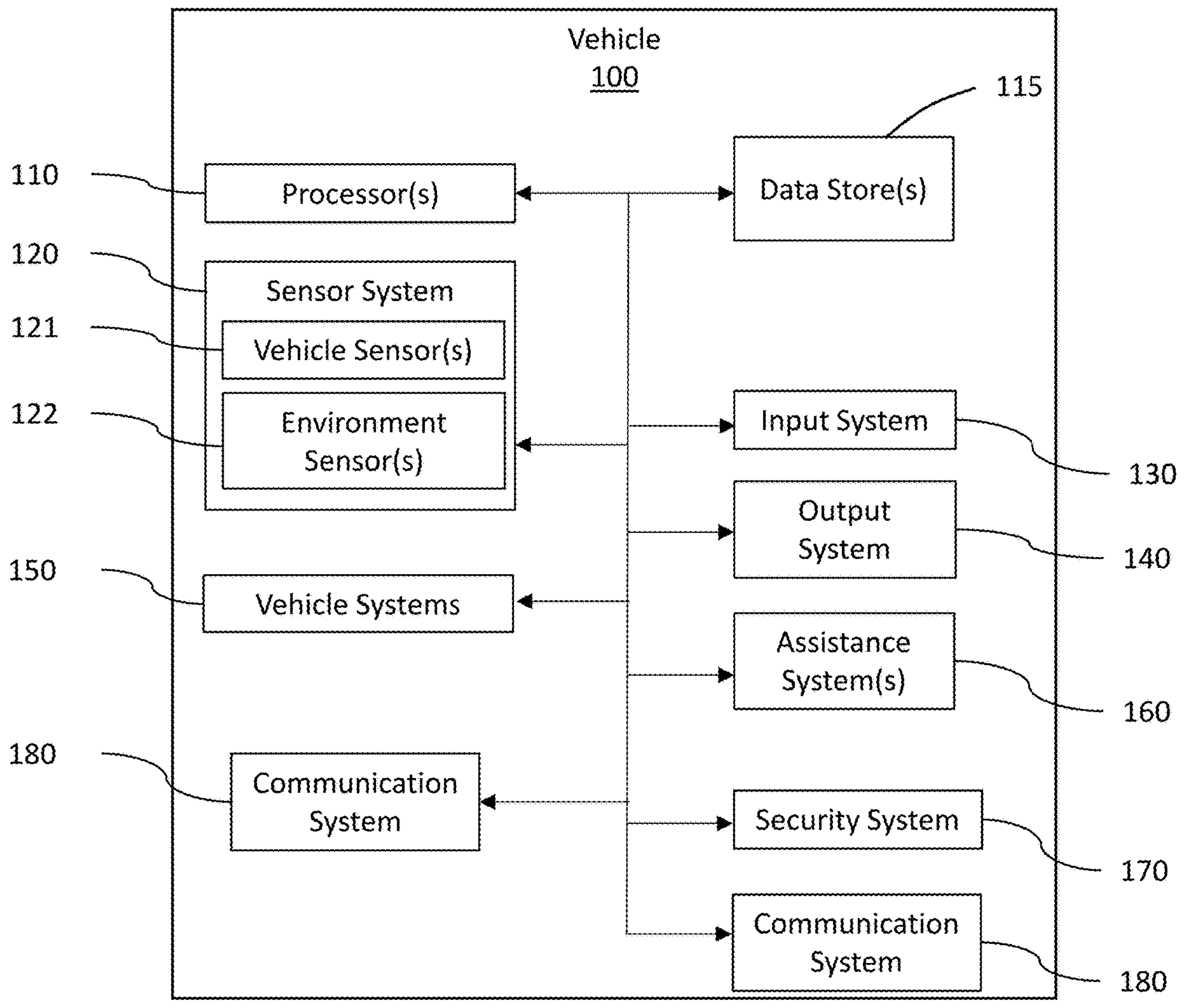
FIG. 1 illustrates one embodiment of a configuration of a vehicle in which example systems and methods may be implemented.

Systems, methods, and other embodiments associated with remote attestation for a resource-constrained device are disclosed. As previously noted, malicious attacks on the computing system of a vehicle can cause significant difficulties. While some attacks may simply expose sensitive information, other attacks may cause problems with the functioning of different vehicle systems. Moreover, because various systems are implemented for specific purposes, these systems may have limited resources (e.g., memory) for performing tasks, especially tasks that are secondary to a primary purpose of the system. As such, effectively implementing security routines in these devices can present specific difficulties.

Therefore, in one approach, an inventive system functions to secure a computing system within a vehicle by using an incremental hash (i.e., also referred to as homomorphic hash herein), which can avoid issues with attempting to process all system data at once. For example, the inventive system periodically performs an attestation process to validate system data that includes program code and associated program data. The system may be induced to perform the attestation according to an attestation request from a remote entity (e.g., a trusted attestation system associated with an OEM) or according to a defined schedule. In either case, the system may monitor for an attestation request and proceed to validate the system data when received.

In particular, the system may pass the attestation request to a trusted program that executes, for example, within a trusted execution environment (TEE). The system then acquires segments of the system in either a predefined size or a dynamically determined size. In the case of being dynamically sized, the system can determine the size according to an extent of available memory within the TEE, system memory load, network load, CPU load, or according to another indicator. Whichever approach is undertaken, the system does not validate the entirety of the system data at once but instead processes segments of the system data in order to accommodate the constrained resources of the system. Thus, the trusted program receives the system data as the segments and individually generates integrity hashes of the segments. The integrity hashes are digests that represent the contents of the segments. Thus, if the values of the segments change, then the resulting integrity hashes will be distinct from hashes generated from the original contents.

Accordingly, the system further processes the multiple integrity hashes into a root hash using a homomorphic hash function. The homomorphic hash effectively combines the integrity hashes into a single hash while summarizing the representations of the segments. Thus, the root hash represents the current state of the system data and whether any changes have occurred from an original trusted version of the system data. Consequently, the system can then, in at least one arrangement, compare the root hash with a reference hash stored in a secure storage of the attesting device. The reference hash is the root hash of the original contents of the system data. Thus, if the root hash and the reference hash match, then the system can validate the integrity of the system data. Otherwise, the integrity of the system data is compromised.

Whichever result the system identifies, the system then proceeds to generate a report about the attestation. The report can include different information depending on the result. For example, in a case where the system identifies that the integrity has been compromised, the report may include the integrity hashes along with an indication of the negative result. The report may also include other security-relevant information, such as system events, audit records, or authentication and access logs. Otherwise, the system generates the report to specify that the system data is valid.

The remote entity to which the system is attesting receives the report and either verifies that the report indicates the attestation succeeded and the system data remains valid and uncorrupted or that the attestation failed. When the attestation fails, the remote entity, in at least one arrangement, performs additional functions to verify the result. For example, the remote entity may verify the individual segments of the system data to facilitate tracing the source of the attestation failure. To achieve this, the remote entity hashes a verified version of the original content of the system data. That is, the remote entity stores a copy of the system data that is known to be valid. The remote entity then is able to hash the segments of the system data stored at the remote entity according to the dynamic or predefined sizes of the segments to generate segment hashes. The segment hashes align with the integrity hashes generated at the attesting device. As such, the remote entity then compares the segment hashes with the integrity hashes provided in the report. From this comparison, the remote entity is able to identify which segments have been altered.

The remote entity can then use the information about the segments to perform further forensic investigation to identify a source of the alterations (e.g., a particular malicious attack) and may also provide mitigation instructions to the attesting device. The remote entity communicates the mitigation instructions to the attesting device in a report, acknowledgement, or other communication in order to cause the attesting device to undertake one or more mitigation actions. The mitigation actions can include restoring the system data to a known valid state, disabling at least a portion of the attesting device to prevent further malicious alteration or other actions that are intended to thwart the malicious attack on the attesting device. In this way, the present approach is able to improve the security of devices with limited resources by ensuring the ability to perform attestation and identify when a malicious alteration of the system data has occurred.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may instead be an electronic device associated with transportation infrastructure (e.g., roadside unit), a cloud-based system communicating with mobile devices, or other devices that may implement electronic systems that are potentially vulnerable to malicious attack, and thus benefit from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may, at least in part, be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-8 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a security system 170 that functions to improve the security of the vehicle 100 by implementing the a process for performing attestation to better secure system data against malicious attack, and in particular, to better secure system data within the context of resource constraints. Moreover, while depicted as a standalone component, in one or more embodiments, the security system 170 is integrated with another system of the vehicle 100 to facilitate improving the security of functions of the systems/modules associated with automated driving and/or other controls of the vehicle 100. The noted functions and methods will become more apparent with a further discussion of the figures. Additionally, it should be appreciated that, as described herein, various functions are discussed as being performed by an attesting device and other functions are described as being performed by a remote entity, which may request the attestation. In this arrangement, the security system 170 may be implemented as separate instances within the associated devices. As such, the description of the security system 170 may involve distributed instances that function in separate roles.

Figure 2:
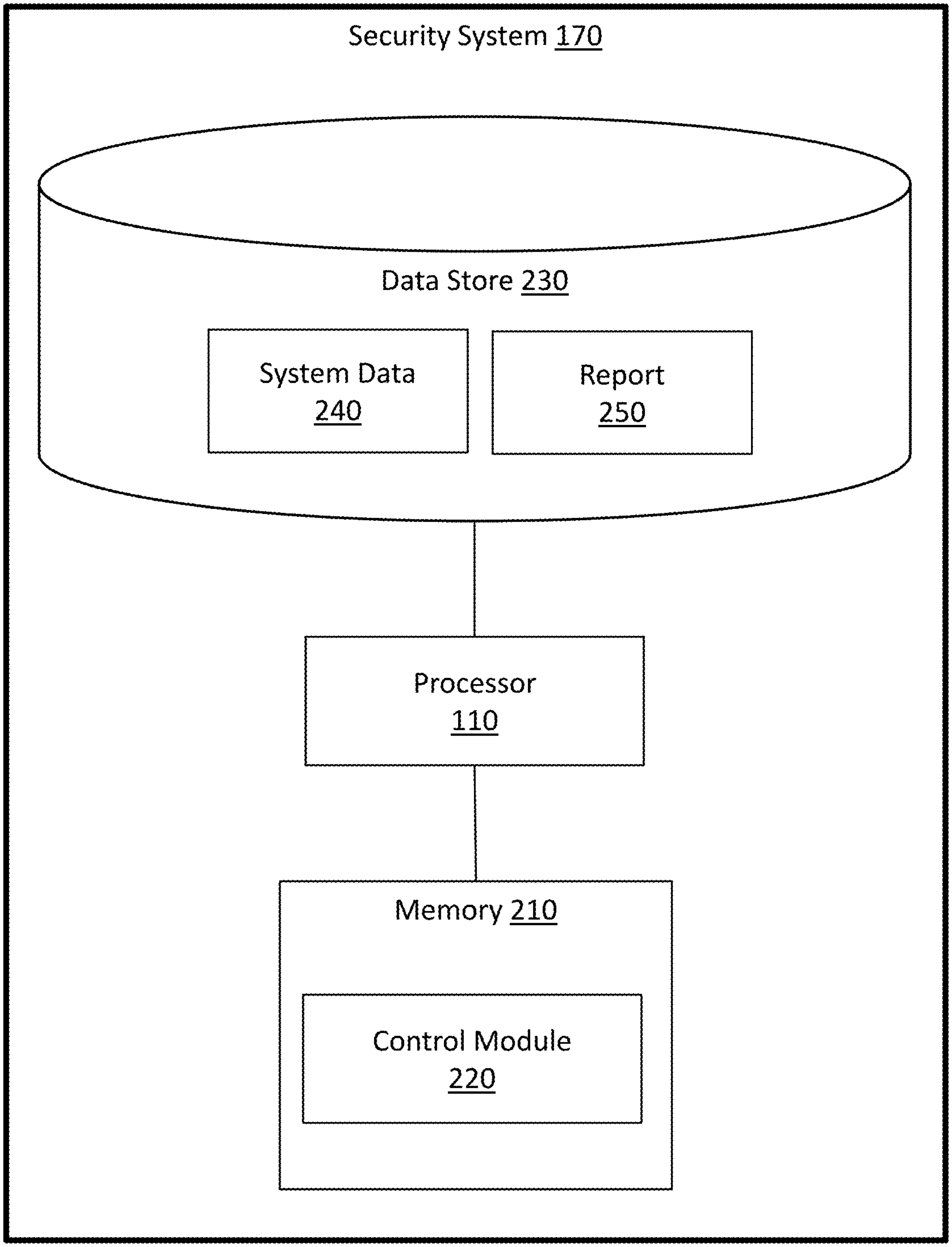
FIG. 2 illustrates one embodiment of a security system that is associated with using incremental hashes to support remote attestation in a resource-constrained environment.

With reference to FIG. 2, one embodiment of the security system 170 is further illustrated. As shown, the security system 170 includes a processor 110. Accordingly, the processor 110 may be a part of the security system 170, or the security system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor, that is capable of performing various functions as described herein when executing encoded functions associated with the security system 170. Moreover, the processor 110 or another electronic processing unit associated with the security system 170 executes various programs (also referred to herein as software components and/or instructions) that are to be secured/protected.

In various embodiments, the particular functionality of a program may vary but can include automated driving functions (e.g., ADAS functions, machine perception, mapping, object detection/identification, path planning, vehicle control routines, and so on), functions associated with control of the vehicle 100, execution of infotainment systems within the vehicle 100, operating systems and associated components, and so on. Thus, various aspects of the program may be related to the functional safety of the vehicle 100, sensitive/personal information, system operation, and so on, which may be targeted by attackers because of the sensitive/critical information associated therewith. Furthermore, it should be appreciated that the program itself can be structured in different ways but is generally formed of multiple segments. The segments include data elements (e.g., variables), and various functions (i.e., blocks of code associated with performing a particular function). Additionally, the programs/software components are comprised of, in at least one arrangement, static data elements. The static data elements include aspects such as source files, text files, and so on.

Moreover, while the programs are generally described from a functional viewpoint, it should be appreciated that the programs may take different forms. That is, the programs may be firmware, operating systems, applications, and so on. In any case, as described herein, the programs and associated data form the system data (e.g., system data 240) as described herein. As will be explained in further detail subsequently, the system data 240 can be divided into segments of a particular size. The security system 170 may define the size dynamically according to, for example, a condition of the security system 170 or other device or as a predefined size (e.g., a packet payload size, a buffer size, etc.).

Continuing with elements of the security system 170, in one embodiment, the security system 170 includes a memory 210 that stores the control module 220 and, in various configurations, additional elements (e.g., system data 240). The memory 210 is a random-access memory (RAM), read-only memory (ROM), a hard disk drive, a flash memory, or other suitable memory for storing the module 220. In any case, the control module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions. Thus, the control module 220 may be embodied as instructions within the memory 210 or as a standalone component, such as a system-on-a-chip (SoC), ASIC, or another electronic device. Moreover, the control module 220 may be further embodied in separate instances, such as an instance within the vehicle 100 and an instance within a remote device, such as a cloud-based monitoring service or another vehicle. As will be described in further detail subsequently, the remote device may be another entity that interacts with the vehicle 100 and, thus, confirms the integrity of the vehicle 100. Similarly, the remote device may be a cloud-based resource, such as a security monitoring service of an OEM that functions to maintain the security of vehicles from a manufacturer.

Furthermore, in one embodiment, the security system 170 includes a data store 230. The data store 230 is, in one arrangement, an electronically-based data structure for storing information. For example, in one approach, the data store 230 is a database that is stored in the memory 210 or another suitable electronic storage medium (e.g., RAM, on-chip cache, etc.), and that is configured with routines that can be executed by the processor 110 for analyzing stored data, providing stored data, organizing stored data, and so on. In any case, in one arrangement, the data store 230 stores data used by the control module 220 in executing various functions. In one embodiment, the data store 230 includes system data 240 and a report 250 along with, for example, other information that is used by the control module 220.

Moreover, the processor 110 may include a trusted execution environment (TEE). The TEE is, in at least one configuration, a secure area of the processor 110 where the executing instructions (i.e., a trusted program) and associated data are protected and retain integrity by virtue of the TEE preventing malicious alteration. In general, the integrity of the instructions and data within the TEE relates to the confidentiality of the TEE that prevents entities outside of the TEE from reading data and/or altering the instructions. The TEE may implement an immutable architecture for security, such as Software Guard Extensions (SGX), Secure Encrypted Virtualization (SEV), TrustZone, or another secure architecture to permit the TEE. In any case, the TEE permits the security system 170 to execute instructions in a protected region that avoids malicious alteration even if other aspects of the security system 170 (e.g., system data) have been maliciously altered.

Turning to the functioning of the control module 220, in general, the control module 220 includes instructions that function to control the processor 110 to validate the system data 240 responsive to an attestation request. The system data 240 is generally memory contents of a memory within the device and includes program instructions, file configuration, logs, data objects, and other information used by the program in execution. The control module 220 hashes segments of the system data 240 to generate representations of the segments as integrity hashes. As noted previously, the control module 220 receives the system data 240 in chunks/segments of a particular size. The control module 220 may determine the size of the segments and control how the segments are acquired. The control module 220 may determine the predefined size according to the size of a buffer/cache or other memory (e.g., a working memory associated with the control module 220), a defined transmission size for a protocol (e.g., TCP packet payload size), or according to another attribute of the system 170 that defines a working memory for the control module 220. Alternatively, the control module 220 dynamically defines the size of the segments. In this approach, the control module 220 may communicate with a process that provides the segments to adapt the size depending on the current conditions of the system 170. For example, the control module 220 may adapt the size according to available memory, such as the remaining amount of working memory within the TEE in which the control module 220 performs the hashing and validation. As a further example, the control module 220 may determine the size dynamically according to other processes that are executing in order to share available resources.

In any case, the control module 220 applies a cryptographic hash function (e.g., MD4, MD5, SHA-1, SHA-2, etc.) or homomorphic hash functions (e.g., LtHash, MuHash, AdHash) to the segments to derive the integrity hashes. Once the control module 220 has generated the integrity hashes for the separate segments, the control module 220 can proceed with generating a root hash that represents the integrity hashes together. In at least one approach, the control module 220 uses a homomorphic hash to generate the root hash. The homomorphic hash is a hash algorithm, such as LtHash, MuHash, AdHash, and so on. In general, the control module 220 creates the root hash by summing the hashes of all of the segments. The control module 220 iterates the hashing process over the integrity hashes until combined to form the root hash. The control module 220 can then use the root hash as a comparison against a reference hash that is formed in the same way as the root hash but from a known valid copy of the system data. In this way, the control module 220 is able to validate the system data 240.

Additional aspects of the security system 170 and attestation requests will be described in relation to subsequent figures. In any case, it should be appreciated that the security system 170 generates the hashes in order to verify and attest to the integrity of the system data 240 on the vehicle 100. In this way, the security system 170 is able to confirm the software is valid and has not been corrupted and, therefore, facilitates interactions with remote devices (i.e., relying parties) by confirming the system data 240 is not compromised and thus will not compromise the remote devices when interacting therewith.

Figure 3:
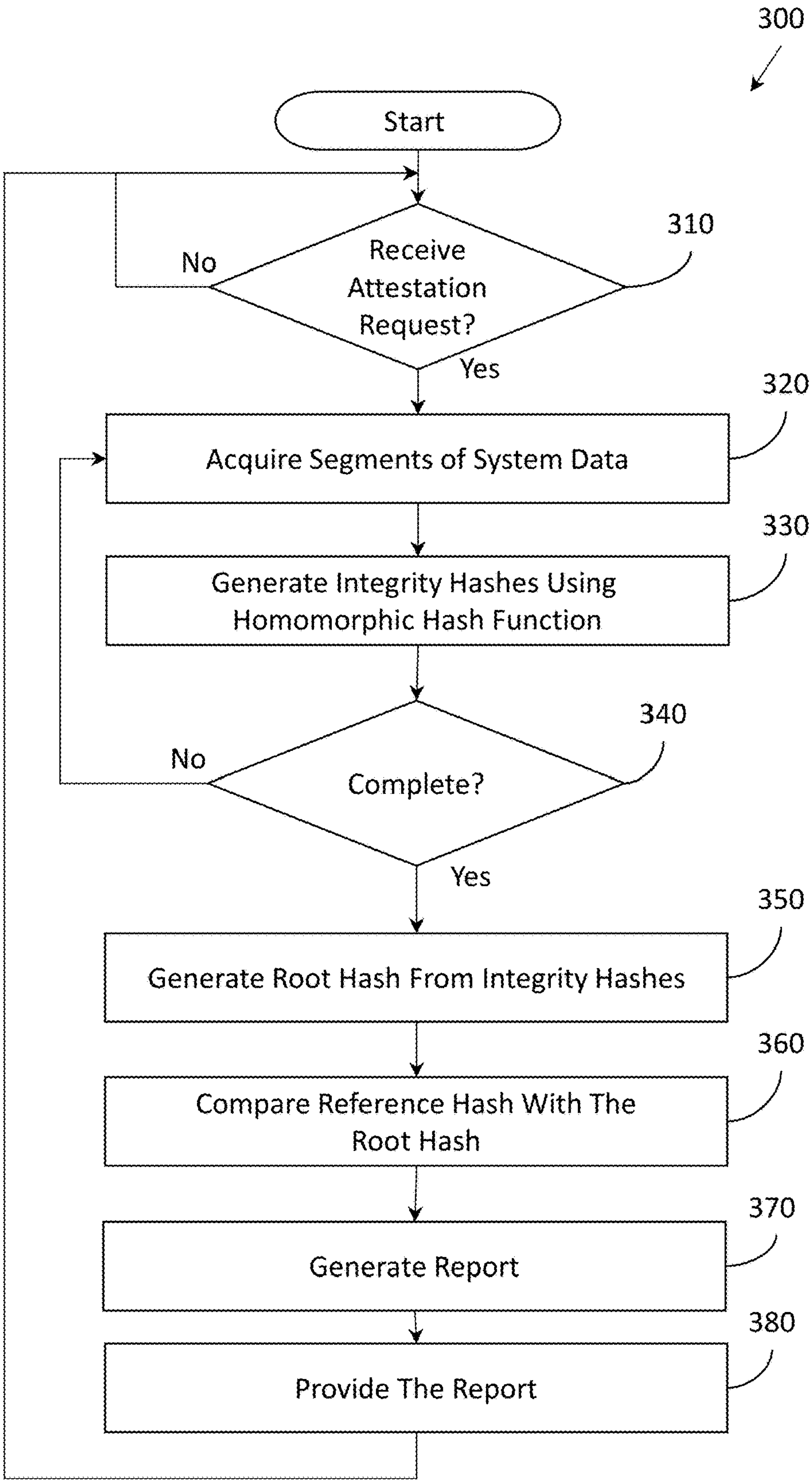
FIG. 3 is a flowchart showing one embodiment of a method for performing attestation in a device with constrained resources.

Additional aspects of securing electronic systems of a vehicle against malicious attacks will be discussed in relation to FIG. 3. FIG. 3 illustrates a method 300 associated with performing remote attestation within a resource-constrained environment. Method 300 will be discussed from the perspective of the security system 170 of FIGS. 1 and 2. While method 300 is discussed in combination with the security system 170, it should be appreciated that the method 300 is not limited to being implemented within the security system 170 but is instead one example of a system that may implement the method 300.

At 310, the control module 220 monitors for an attestation request. The attestation request may be generated automatically within the system 170 or may be received from a remote entity. For example, the remote entity generates the attestation request as a regular monitoring function to check the vehicle 100 for continued integrity. In a further example, the remote entity generates the attestation request when connecting with the vehicle 100 to provide a service and/or to receive information from the vehicle 100. In general, the attestation request and subsequent verification function as a way for the remote entity to verify the integrity of the vehicle 100. Alternatively, or additionally, the security system 170 generates internal requests according to a schedule. The schedule may define regular or irregular intervals for performing the attestation. In at least one arrangement, the schedule defines conditions or events for inducing an attestation request, such as the occurrence of a request to connect with another device, a particular program action, a timer, and so on. In any case, the form of the attestation request itself may vary depending on the implementation but generally includes a generic request for the security system 170 to initialize attestation and may further include verification information about a requesting party, such as a signed digital certificate or other cryptographic element to verify the identity of the source and a freshness value, such as a counter or nonce to avoid replay of stale valid requests. As such, the control module 220 monitors for the attestation request at 310 and proceeds with subsequent actions upon identifying receipt of the attestation request.

At 320, the control module 220 acquires segments of the system data 240 responsive to the attestation request. In general, the control module 220 collects the segments according to a segment size. As previously noted, the segment size can be predefined or dynamically determined. It should be noted that the process of performing attestation, as described at 320-380, in one or more configurations, occurs within a trusted execution environment (TEE) of the attesting device. Thus, the attestation request and the segments of data pass into the TEE. The security system 170 and/or the TEE may be resource-constrained systems. That is, the systems may have limited memory and/or other computational resources for performing the attestation. Even still, in one or more implementations, the constrained system can collect/process the data under attestation without needing to pause the execution of functions within a main execution environment of the system. Otherwise, the constrained system works with in cooperation with the main execution environment of the system to collect and process the data. As such, performing the attestation on the segments instead of the system data 240 as a whole permits the security system 170 to more efficiently perform the attestation and avoid issues with memory overflows.

At 330, the control module 220 generates the integrity hashes of the segments according to a cryptographic hash or homomorphic hash function. In general, the control module 220 individually generates the integrity hashes as the segments are received, for example, within the TEE. The control module 220 iteratively performs the hashing as the segments are received.

At 340, the control module 220 determines if all of the segments have been hashed. If there are remaining segments, then the control module 220 proceeds to hash a further segment at 330 and repeats this process until identifying a final segment. In one or more arrangements, the control module 220 determines that all of the segments have been hashed according to a flag or other indicator received with a final segment. That is, the system data 240 itself and/or a packet that encapsulates the segment of the system data 240 includes an indicator to specify that the segment is the last segment of the system data 240. When embedded as part of the system data 240, the indicator may simply be buffer or padding bits appended to the system data 240 when the segment does not fill a particular chunk/segment size.

At 350, the control module 220 generates, using the integrity hashes, a root hash according to a homomorphic hash function. That is, the control module 220 uses the homomorphic hash function to combine the integrity hashes together into a single value that represents a current state of the system data 240 overall. In this way, the control module 220 provides a single value to characterize the system data 240.

At 360, the control module 220 determines an integrity of the system data by comparing the root hash with a reference hash. The reference hash is a hash formed in a similar manner as the root hash, but the reference hash is of the system data 240 at a point in time when the state of the system data 240 is known to be valid and uncorrupted. Thus, the reference hash is used as a comparison against a known valid state of the system data 240. Accordingly, identifying whether the root hash matches the reference hash indicates whether the integrity of the system is valid or invalid. The validity specified by the hash is generally indicative of whether the segments have been modified without permission by, for example, a malicious attack.

At 370, the control module 220 generates a report about the result of the comparison. The report may include different information depending on the result of the comparison. For example, when the control module 220 determines that the system data 240 is valid and the integrity has not been corrupted, the control module 220 generates the report with an indicator of the positive result and may further include a copy of the root hash as confirmation. However, when the result is negative, the control module 220 generates the report to include a negative indicator along with the integrity hashes of the segments. By providing the integrity hashes, the system permits the remote entity to perform a forensic investigation of the system data 240, as will be explained further subsequently.

At 380, the control module 220 provides the report according to the integrity. The control module 220 provides the report by communicating the report to the remote entity (i.e., the requesting device) over a communication channel, such as the Internet. After providing the report, the control module 220 may then monitor for a subsequent acknowledgment communication from the remote entity. The responsive acknowledgment communication may include various information depending on the result. For example, a positive report may induce the creation of a direct link/connection for exchanging information with the remote entity for which information about the connection may be included in the acknowledgment communication. When the report is negative, the acknowledgment communication may be a mitigation message that specifies a mitigation action for the security system 170 to perform. Accordingly, the mitigation message is configured to cause an attesting device to perform the mitigation action. The mitigation action can be different actions or sets of actions depending on the implementation. In general, the mitigation action is designed to correct or at least mitigate further harm from a malicious attack. By way of example, the mitigation action can include restoring a memory of the attesting device (i.e., the system data 240), disabling at least a portion of the attesting device (i.e., one or more systems within the vehicle 100), or another mitigating action.

Figure 4:
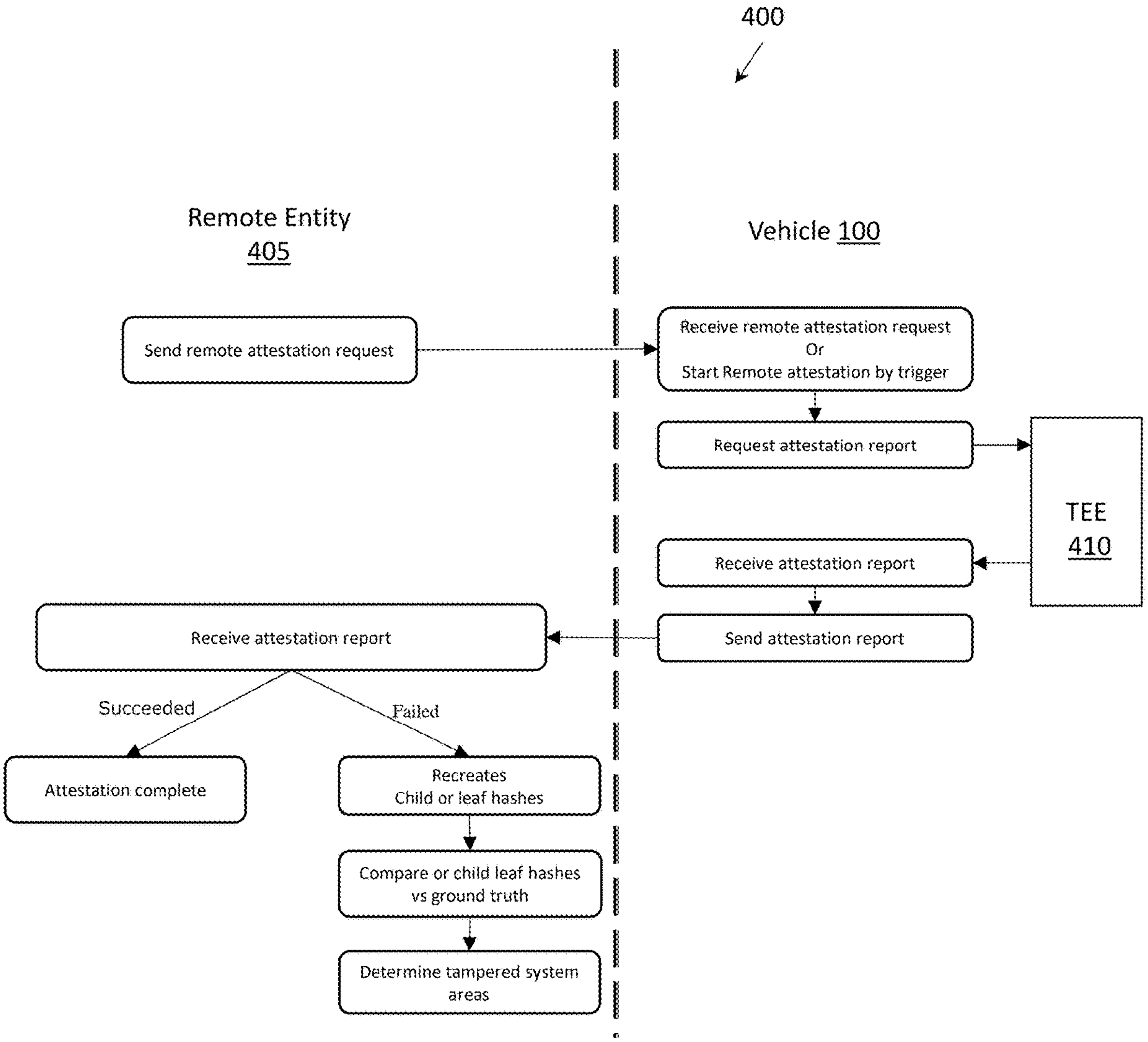
FIG. 4 illustrates a system flow diagram of functions performed by separate entities associated with remote attestation.
Figure 5:
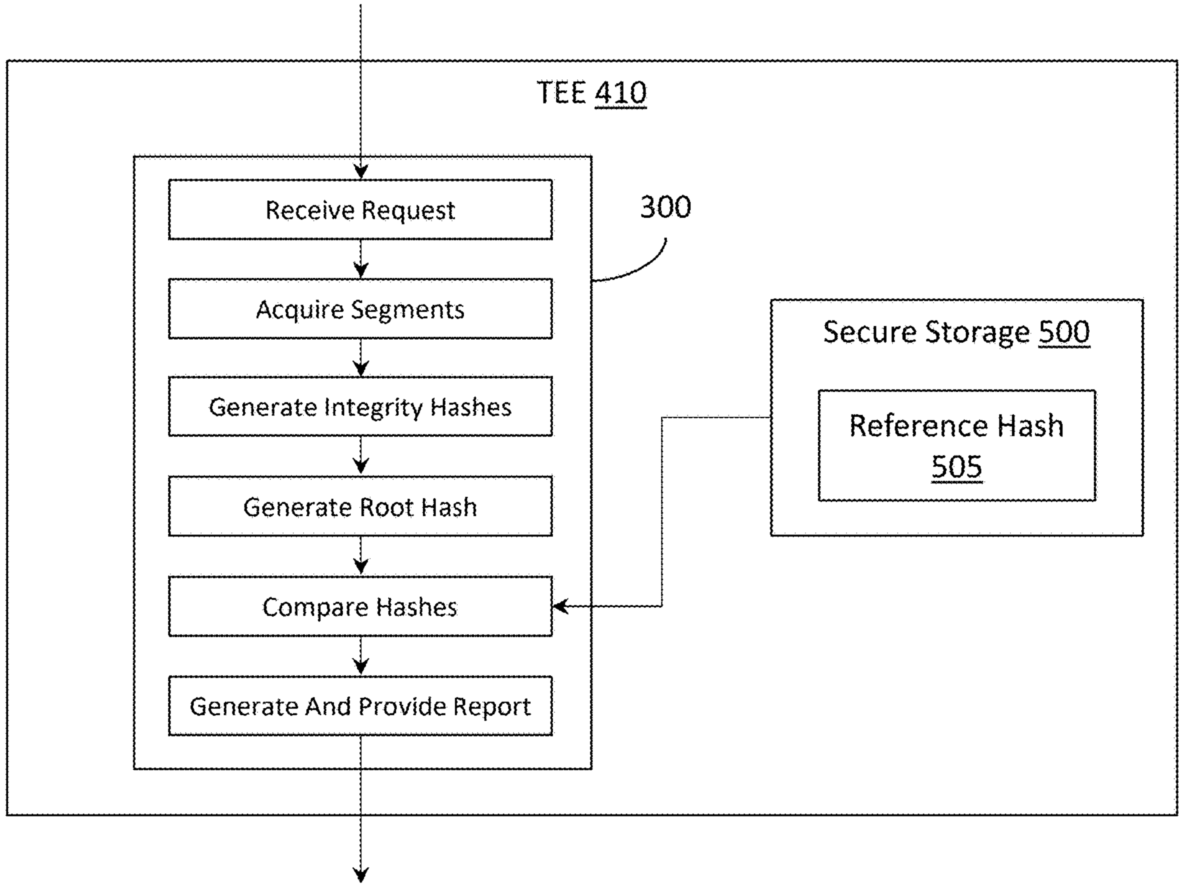
FIG. 5 illustrates a diagram of a trusted execution environment (TEE) and associated functions performed therein.

As further explanation of the attestation process, consider FIGS. 4 and 5. FIG. 4 illustrates an example process flow 400 between a remote entity 405 and the vehicle 100 within which the security system 170 is performing attestation. As shown, the remote entity 405 sends the remote attestation request to initiate the attestation process. The vehicle 100 receives the request or begins attestation according to a defined schedule. In either case, the request is forwarded into the trusted execution environment (TEE) 410. FIG. 5 further illustrates the TEE 410. FIG. 5 illustrates the method 300 executing within the TEE 410. For purposes of brevity, the method 300 is shown in an abbreviated form. However, the illustration of the method 300 is not intended to be limiting but as an illustration of the execution of the method within the environment of the TEE 410.

In any case, the TEE 410 includes a secure storage 500 that stores the reference hash 505. The comparison performed by the method 300 uses the reference hash 505 to validate the root hash generated from the system data 240. The attestation report is then generated within and provided from the TEE 410. Returning to FIG. 4, the vehicle 100 then receives and sends the attestation report to the remote entity 405. The remote entity proceeds to receive the attestation report and determines whether the attestation is complete due to a successful validation of the vehicle 100 or whether the validation failed. In the case of failure, the remote entity 405 (i.e., an instance of the security system 170 executing on the remote entity 405) proceeds to recreate the integrity hashes in the form of segment hashes (identified as leaf hashes in FIG. 4) and compare the segment hashes with the received integrity hashes from the vehicle 100. From this comparison, the remote entity 405 is able to identify tampered systems areas (i.e., segments of the system data 240) and then, in at least one arrangement, perform mitigation actions or other actions (e.g., analytics, further forensic investigation, etc.).

Figure 6:
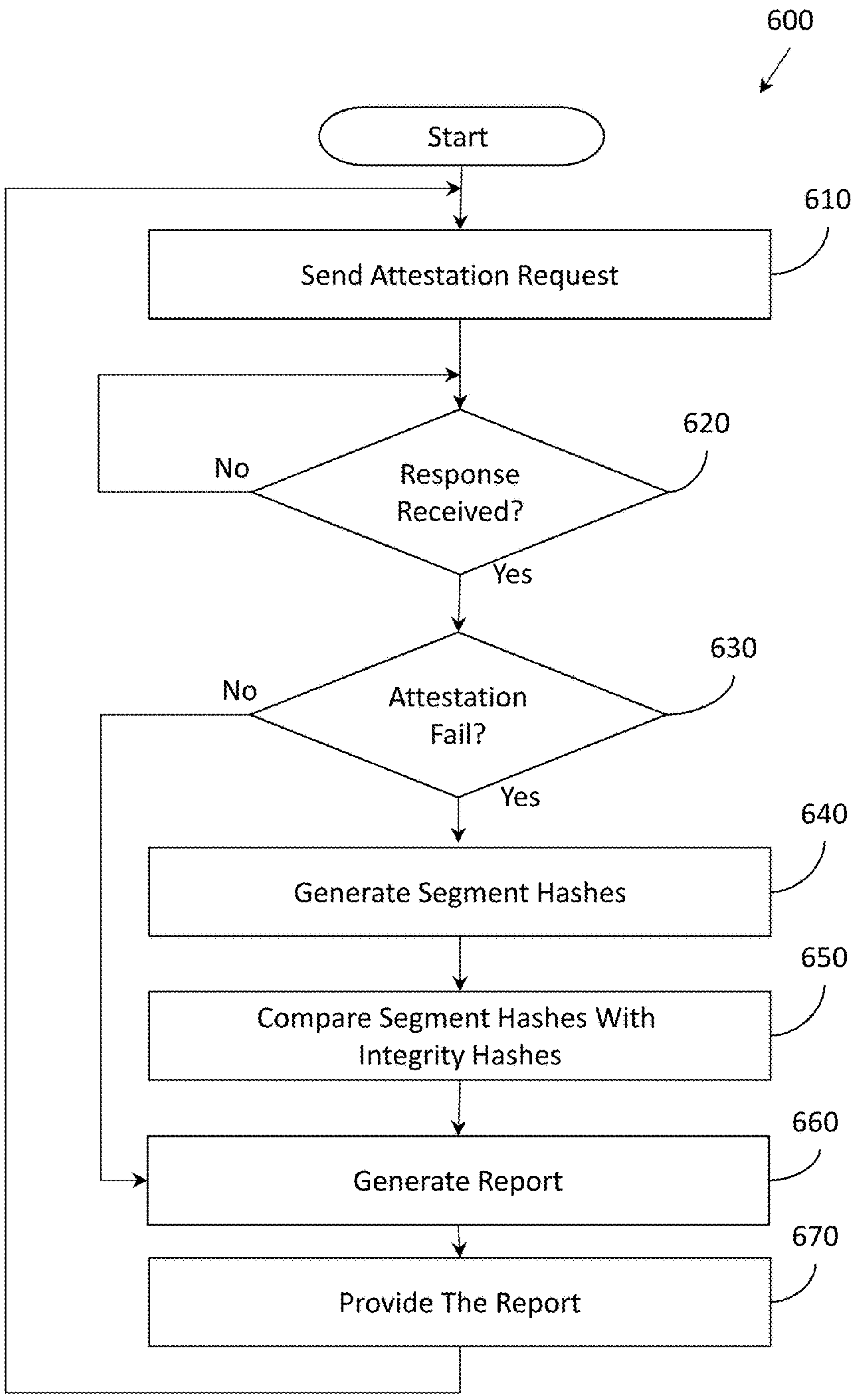
FIG. 6 is a flowchart showing one embodiment of a method for requesting attestation and validating results of remote attestation.

Additional aspects of using remote attestation will be discussed in relation to FIG. 6. FIG. 6 illustrates a method 600 associated with requesting attestation and validating the results of attestation. Method 600 will be discussed from the perspective of the security system 170 of FIG. 2. While method 600 is discussed in combination with the security system 170, it should be appreciated that the method 600 is not limited to being implemented within the security system 170 but is instead one example of a system that may implement the method 600. Moreover, it should be noted that as described in FIG. 6, the method 600 is executing in a remote entity that is generating the attestation request for validating the vehicle 100.

At 610, the remote entity generates and sends an attestation request. In one arrangement, the remote entity generates the attestation request as a regular monitoring function to check the vehicle 100 for continued integrity. In a further example, the remote entity generates the attestation request when connecting with the vehicle 100 to provide a service and/or to receive information from the vehicle 100. In general, the attestation request and subsequent verification function as a way for the remote entity to verify the integrity of the vehicle 100. The form of the attestation request itself may vary depending on the implementation but generally includes a generic request for the root hash of the vehicle 100 and may further include verification information about the requesting party, such as a signed digital certificate or other cryptographic element to verify the identity of the source.

At 620, the remote entity monitors for a response from the attesting device. For example, the control module 220 of the remote entity monitors for a communication from the attesting device in response to the original attestation request. If received, then the control module 220 proceeds with method 600 by processing the response. Otherwise, the monitoring continues.

At 630, the control module 220 parses the response from the attesting device to determine whether the attestation failed or not. In general, the response includes, for example, information indicating the result, such as a flag or other identifier. In one arrangement, the response includes the integrity hashes when the attestation fails, which may also function as a broad indicator of the result. In yet further arrangements, the response can also include the root hash and/or other information about the result. In any case, if the control module 220 identifies that the attestation was successful, then the control module 220 proceeds to generate the report, as described along with 660. If the control module 220 determines that the attestation failed, then the control module 220 proceeds to perform additional functions, as described at 640-650.

At 640, the control module 220 proceeds with generating the segment hashes from a verified version of the system data 240. The verified version of the system data 240 is a known valid copy of the system data 240 that is stored with the remote entity. Thus, the verified version should match the system data 240 stored with the vehicle 100. However, since the validation has failed, the remote entity can instead use the locally stored verified version to trace the integrity failure. Thus, the control module 220 generates the segment hashes as corollaries of the integrity hashes from the vehicle 100 but with known valid information to provide a valid point of comparison.

At 650, the control module 220 within the remote entity identifies the integrity failure from tracing the hashes. In general, the remote entity compares the segment hashes against integrity hashes from the response by the vehicle 100 to determine the source of the integrity failure (i.e., the particular segment that has been altered). As part of identifying a source of the failure, the remote entity may log the failure by storing information about the segment and also additional information about the vehicle 100, such as a geographic location, a make/model/year, and so on.

At 660, the control module 220 generates a report about the attestation. That is, if the attestation was successful, then, in one arrangement, the control module 220 generates the report to indicate the successful attestation and may include a copy of the root hash provided by the vehicle 100, which can then be logged when the report is provided at 670. However, if the attestation failed, then the remote entity generates the report, at least in part, as a communication to the vehicle 100. That is, the remote entity can mitigate the integrity failure from the attack according to a mitigation deployment in the form of one or more mitigation actions identified in the report. The control module 220 may also log the source of the integrity failure in a retained copy of the report and/or append other security-relevant log files obtained from the vehicle 100.

At 670, the remote entity provides the report. The remote entity may provide the report by logging the report in a local attestation log and/or by communicating the report to the vehicle 100. The remote entity may communicate the report as a mitigation deployment to the vehicle 100 in order to correct the failure or at least prevent further damage. For example, the mitigation deployment is a control communicated to the vehicle 100 that causes the vehicle 100 to perform one or more mitigation actions. The actions can include restoring the software component(s) to a prior state using a system image, instantiating a fail-safe mode within the vehicle 100, or performing another action to remediate the failure. While the mitigation deployment is described as being a control, the deployment may further include one or more files (e.g., images) for the vehicle 100 to use when performing the mitigation.

The control module 220 within the vehicle 100 mitigates the integrity failure from an attack according to the mitigation deployment. That is, the vehicle 100 executes one or more actions using existing functionality or through an executable provided by the remote device in order to correct the integrity failure. In this way, the security system 170 is able to use the homomorphic hash to secure the vehicle 100 and trace failures when they occur, thereby improving the operation of the associated computing systems and robustness against attack.

Figure 7:
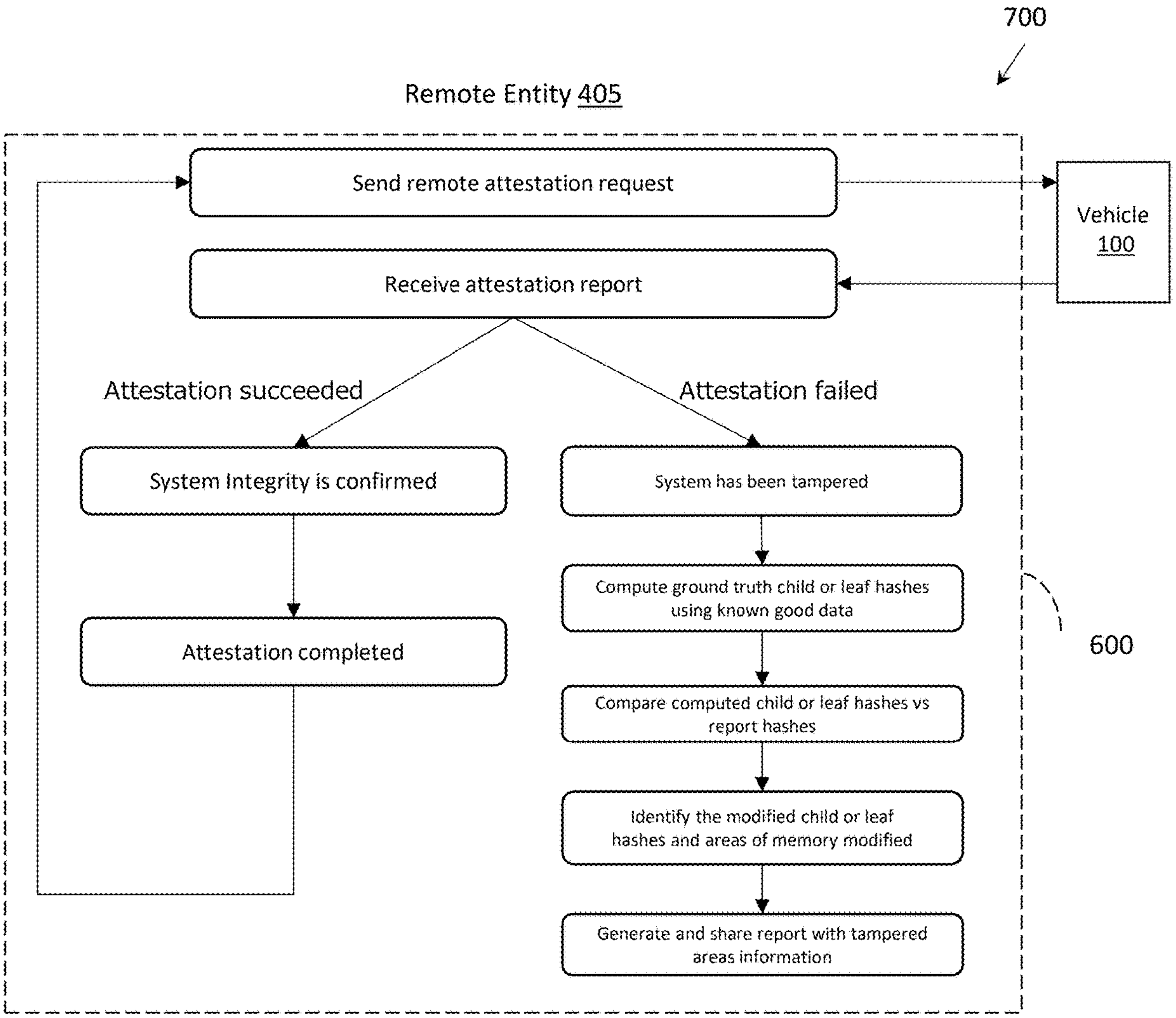
FIG. 7 is a flowchart showing a method for performing remote attestation by a remote device.

FIG. 7 illustrates an example 700 of the remote entity 405 and functions performed there for validating the report provided by the vehicle 100. As shown, the remote entity 405 performs a version of the method 600, which is shown in an abbreviated form. In any case, the remote entity 405 performs a different set of functions depending on the result of the attestation within the vehicle 100. In particular, the remote entity 405 uses the hashes of the segments provided by the vehicle 100 when a failure occurs to identify tampered/compromised segments within the vehicle 100.

Figure 8:
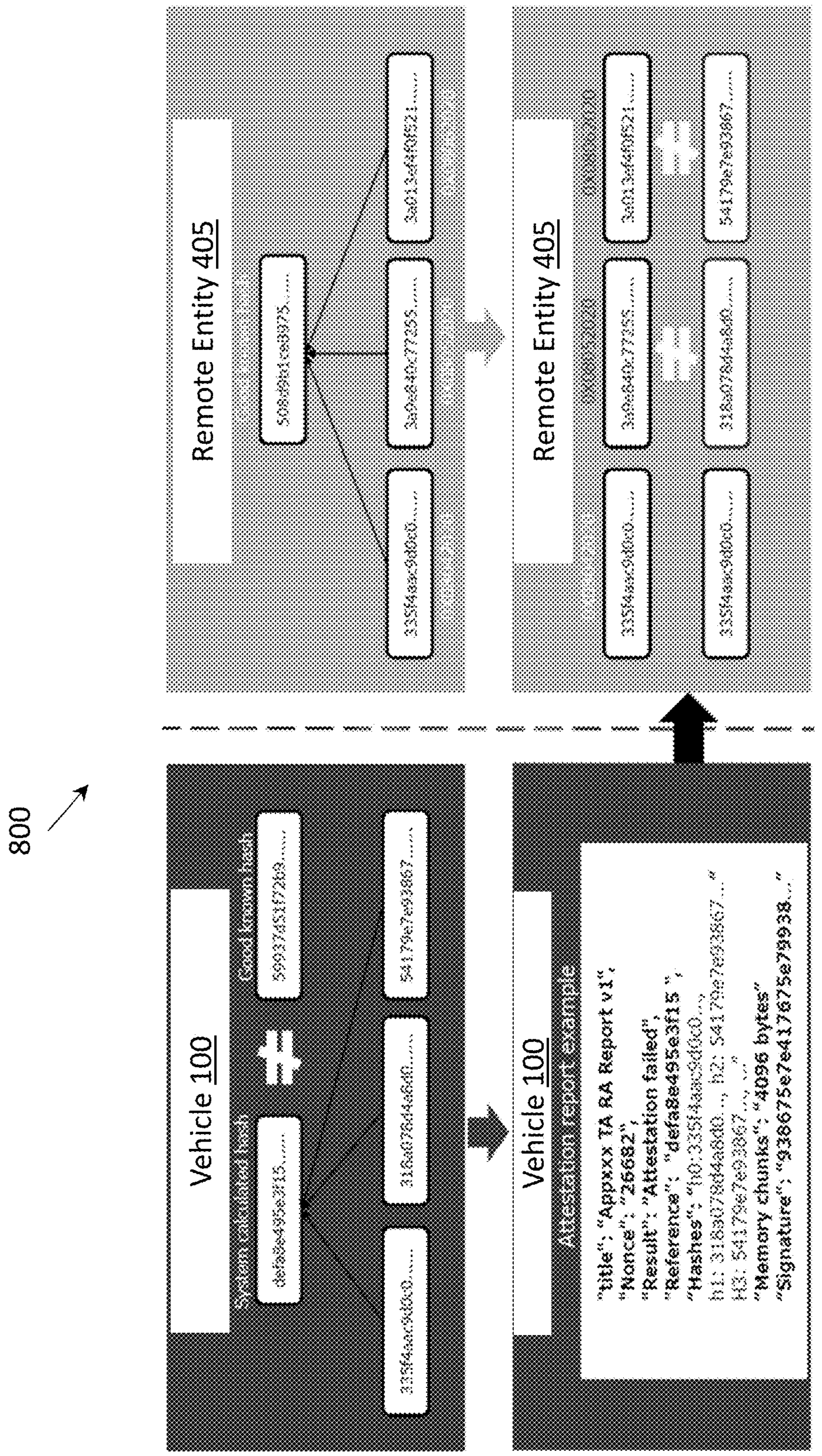
FIG. 8 is a diagram illustrating one example of remote attestation.

A further example 800 is shown in FIG. 8. The example 800 illustrates the process of performing attestation in the vehicle 100 and then validating the results in the remote entity 405. For example, as illustrated, the vehicle 100 performs the attestation and identifies that the system-calculated hash does not match the good known hash. As such, the vehicle generates an attestation report that includes the hashes of the segments along with a segment/chunk size, an indicator of the failure, and so on. The vehicle 100 communicates the report to the remote entity 405, which stores the good known hash (i.e., the reference hash) and can also generate the segment hashes associated with the reference hash. The remote entity can then compare the integrity hashes of the segments from the vehicle 100 with the locally generated hashes of the segments and compare these to identify which segments have been altered/tampered. As shown in the example 800, two of the segments are found to not match. In this way, the security system 170 is able to account for resource constraints of systems by accommodating different segment sizes, while also retaining security through the attestation process and permitting tracing of integrity failure to improve the security of the implementing devices.

Additionally, it should be appreciated that the security system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the security system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps.

The one or more data stores 115 can include sensor data. In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the security system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150 and, thus, may be partially or fully autonomous.

The processor(s) 110, the security system 170, and/or the assistance system 160 can be operatively connected to communicate with the various vehicle systems 150 and/or individual components thereof. For example, returning to FIG. 1, the processor(s) 110, the security system 170, and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150.

The processor(s) 110, the security system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the security system 170, and/or the assistance system 160 can control the direction and/or speed of the vehicle 100. The processor(s) 110, the security system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the security system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, large language models (LLMs), or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160, either independently or in combination with the security system 170, can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, LLMs or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A security system, comprising:

one or more processors;

a memory communicably coupled to the one or more processors and storing:

a control module including instructions that, when executed by the one or more processors, cause the one or more processors to:

acquire segments of system data within an attesting device responsive to an attestation request, including instructions to collect the segments according to a segment size that is defined according to constraints of the attesting device;

determine an integrity of the system data by identifying whether a root hash comprised of integrity hashes of the segments matches a reference hash, including instructions to generate, using the integrity hashes, the root hash according to a homomorphic hash; and provide a report according to the integrity.

2. The security system of claim 1, wherein the control module includes the instructions to determine the integrity including instructions to:

generate the integrity hashes of the segments according to a hash function;

generate, using the integrity hashes, a root hash according to the homomorphic hash; and compare the root hash with the reference hash to determine if the segments have been modified without permission.

3. The security system of claim 1, wherein the control module includes the instructions to acquire the segments including instructions to collect the segments according to the segment size defined according to the constraints of the attesting device including one or more of a size of a buffer and a packet payload size, and wherein the control module includes the instructions to acquire and validate the segments within a trusted execution environment (TEE) of the attesting device.

4. The security system of claim 1, wherein the control module includes the instructions to provide the report including instructions to, when the integrity indicates that the system data is at least partially corrupted, generate the report to include the integrity hashes to facilitate tracing which of the segments are corrupt, and subsequently acquiring a mitigation message that specifies a mitigation action for resolving an integrity failure, the mitigation action including at least one: restoring a memory of the attesting device and disabling the attesting device, and wherein the system data includes program instructions and program data.

5. The security system of claim 1, wherein the control module further includes instructions to:

verify, in a remote entity that provided the attestation request, the segments of the system data using the report, wherein the report includes the integrity hashes and attribute information about the segments.

6. The security system of claim 5, wherein the control module includes instructions to verify the segments including instructions to compute segment hashes for the segments of the system data from validated data stored at the remote entity, and comparing the segment hashes with the integrity hashes to identify which one or more of the segments of the system data is corrupt.

7. The security system of claim 1, wherein the control module further includes instructions to:

receive, in the attesting device responsive to the report indicating the integrity of the system data is corrupted, a mitigation message that causes the attesting device to perform a mitigation action identified in the mitigation message, the mitigation action including one of: restoring a memory of the attesting device, and disabling at least a portion of the attesting device.

8. The security system of claim 1, wherein the security system is embedded within a vehicle and performs attestation for a remote entity using the root hash.

9. A non-transitory computer-readable medium storing instructions that, when executed by one or more processors, cause the one or more processors to:

acquire segments of system data within an attesting device responsive to an attestation request, including instructions to collect the segments according to a segment size that is defined according to constraints of the attesting device;

determine an integrity of the system data by identifying whether a root hash comprised of integrity hashes of the segments matches a reference hash, including instructions to generate, using the integrity hashes, the root hash according to a homomorphic hash; and provide a report according to the integrity.

10. The non-transitory computer-readable medium of claim 9, wherein the instructions to determine the integrity include instructions to:

generate the integrity hashes of the segments according to a hash function;

generate, using the integrity hashes, a root hash according to the homomorphic hash; and compare the root hash with the reference hash to determine if the segments have been modified without permission.

11. The non-transitory computer-readable medium of claim 9, wherein the instructions to acquire the segments include instructions to collect the segments according to the segment size defined according to the constraints of the attestation device including one or more of a size of a buffer and a packet payload size, and wherein the instructions to acquire and validate the segments execute within a trusted execution environment (TEE) of the attesting device.

12. The non-transitory computer-readable medium of claim 9, wherein the instructions to provide the report include instructions to, when the integrity indicates that the system data is at least partially corrupted, generate the report to include the integrity hashes to facilitate tracing which of the segments are corrupt, and subsequently acquiring a mitigation message that specifies a mitigation action for resolving an integrity failure, the mitigation action including at least one: restoring a memory of the attesting device and disabling the attesting device, and wherein the system data includes program instructions and program data.

13. The non-transitory computer-readable medium of claim 9, wherein the instructions further include instructions to:

verify, in a remote entity that provided the attestation request, the segments of the system data using the report, wherein the report includes the integrity hashes and attribute information about the segments.

14. A method, comprising:

acquiring segments of system data within an attesting device responsive to an attestation request, including collecting the segments according to a segment size that is defined according to constraints of the attesting device;

determining an integrity of the system data by identifying whether a root hash comprised of integrity hashes of the segments matches a reference hash, including generating, using the integrity hashes, the root hash according to a homomorphic hash; and providing a report according to the integrity.

15. The method of claim 14, wherein determining the integrity includes:

generating the integrity hashes of the segments according to a hash function;

generating, using the integrity hashes, a root hash according to the homomorphic hash; and comparing the root hash with the reference hash to determine if the segments have been modified without permission.

16. The method of claim 14, wherein acquiring the segments includes collecting the segments according to the segment size defined according to the constraints of the attesting device including one or more of a size of a buffer and a packet payload size, and wherein acquiring and validating the segments occurs within a trusted execution environment (TEE) of the attesting device.

17. The method of claim 14, wherein providing the report includes, when the integrity indicates that the system data is at least partially corrupted, generating the report to include the integrity hashes to facilitate tracing which of the segments are corrupt, and subsequently acquiring a mitigation message that specifies a mitigation action for resolving an integrity failure, the mitigation action including at least one: restoring a memory of the attesting device and disabling the attesting device, and wherein the system data includes program instructions and program data.

18. The method of claim 14, further comprising:

verifying, in a remote entity that provided the attestation request, the segments of the system data using the report, wherein the report includes the integrity hashes and attribute information about the segments.

19. The method of claim 18, wherein verifying the segments includes computing segment hashes for the segments of the system data from validated data stored at the remote entity, and comparing the segment hashes with the integrity hashes to identify which one or more of the segments of the system data is corrupt.

20. The method of claim 14, further comprising:

receiving, in the attesting device responsive to the report indicating the integrity of the system data is corrupted, a mitigation message that causes the attesting device to perform a mitigation action identified in the mitigation message, the mitigation action including one of: restoring a memory of the attesting device, and disabling at least a portion of the attesting device.

* * * * *